Jan. 2, 1934.                H. PLIES                1,941,753
                        HOLDER FOR MICROSCOPES
                          Filed Oct. 7, 1932
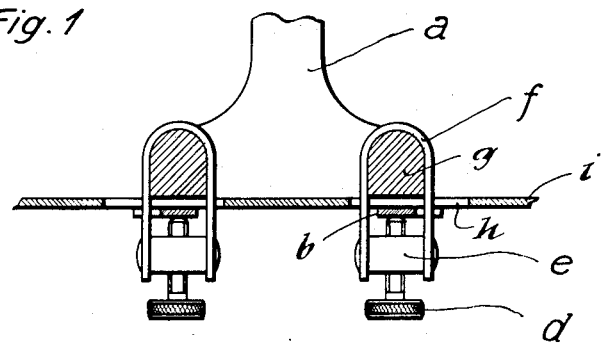
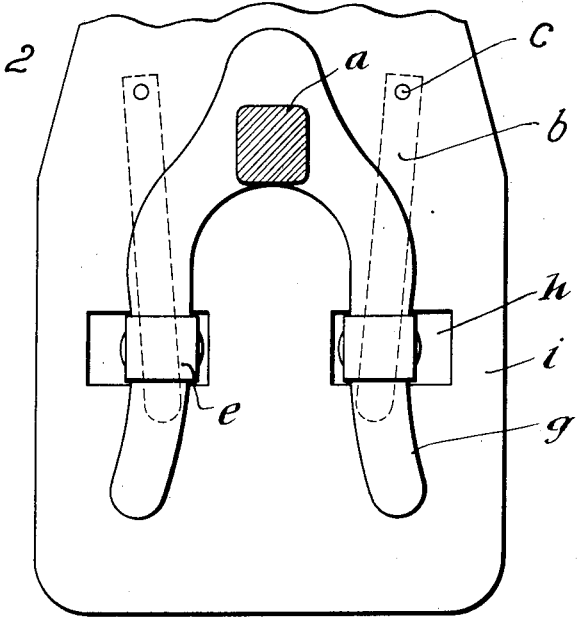
INVENTOR
Heinrich Plies
BY George C. Heimrich
ATTORNEY Patented Jan. 2, 1934

1,941,753

UNITED STATES PATENT OFFICE 1,941,753

HOLDER FOR MICROSCOPES

Heinrich Plies, Wetzlar, Germany, assignor to Ernst Leitz, Optische Werke, G. m. b. H., Wetzlar, Germany Application October 7, 1932, Serial No. 636,645, and in Germany October 15, 1931

1 Claim. (Cl. 248—16.5)

This invention relates to improvements in microscopes, particularly to the means for securely holding a microscope to a table or other support, and it is the principal object of my invention to provide elastic or yielding means passed about the feet of the microscope through openings in a table or other support for the microscope while a clamping device clamps the feet of the microscope firmly into their adjusted positions preventing its tilting or turning over.

Another object of my invention is the provision of a microscope securing device the clamp means of which are guided in suitable guides on the underside of the table or support for the microscope turning about a pivot point so that during the displacement of the microscope the longitudinal guides adjust themselves to the width of the microscope's feet.

A further object of my invention is the provision of a holding device for microscopes, of simple and inexpensive construction, yet durable and highly efficient in operation allowing a lateral as well as longitudinal displacement and locking of the microscope in any of its adjusted positions secured against overthrowing.

These and other objects and advantages of my invention will become more fully known as the description thereof proceeds and will then be specifically defined in the appended claim.

In the accompanying drawing forming a material part of this disclosure:

Fig. 1 is a fragmentary sectional front elevation of a microscope holding or clamping device constructed according to my invention.

Fig. 2 is a top plan view thereof.

As illustrated, a microscope $a$ the body of which is only partly illustrated, has supporting feet $g$, and loops $f$ of yielding material such as for instance leather, or the like, are guided about the feet $g$ and through slots $h$ in a table or support $i$, to the underside thereof where the spaced ends of these loops are held apart by lugs $e$ through which clamping screws $d$ extend, the inner ends of which engage longitudinal guides $b$ on the underside of the support $i$ which are turnable about the pivot points $c$.

In operation, the yielding leather strips or loops are guided about the feet of the microscope through the openings in the supporting table to the underside thereof and the clamping screws are tightened so as to tauten the straps with the ends of the screws guided in the guides $b$ on the underside of the table which owing to their pivotal attachment at one point will accommodate themselves to the feet of the microscope and the same will be firmly held in its adjusted position against tilting and overthrow.

It will be understood that I have described and shown the preferred form of my device only as one example of the many possible ways to practically construct the same and that I may make such changes in the general arrangement and in the construction of the minor details of my device as come within the scope of the appended claim without departure from the spirit of my invention and the principles involved.

Having thus described my invention what I claim as new and desire to secure by Letters Patent is:

A holder for microscopes including their feet, comprising loops of yielding material guided about the feet of said microscope and through openings in a support to the underside thereof, lugs keeping the ends of said loops spaced below said support, longitudinally extending guides on the underside of said support pivoted thereto at one end, and clamping screws extending through said lugs engaging the inner ends of said guides.

HEINRICH PLIES.